US008699615B2

(12) United States Patent
Couillard et al.

(10) Patent No.: US 8,699,615 B2

(45) Date of Patent: Apr. 15, 2014

(54) SIMULTANEOUS COMMUNICATIONS JAMMING AND ENABLING ON A SAME FREQUENCY BAND

(75) Inventors: Denis Couillard, Montréal (CA); François Gagnon, Lachine (CA)

(73) Assignee: Ultra Electronics TCS Inc., Montreal, Quebec (CA)

( * ) Notice: Subject to any disclaimer, the term of this patent is extended or adjusted under 35 U.S.C. 154(b) by 539 days.

(21) Appl. No.: 13/045,188

(22) Filed: Mar. 10, 2011

(65) Prior Publication Data

US 2013/0315341 A1 Nov. 28, 2013

Related U.S. Application Data

(60) Provisional application No. 61/350,122, filed on Jun. 1, 2010.

(51) Int. Cl.
*H04B 15/00* (2006.01)

(52) U.S. Cl.
USPC ........... 375/285; 375/259; 375/295; 375/316; 375/211; 375/219

(58) Field of Classification Search
USPC .................. 375/285, 259, 295, 316, 211, 219
See application file for complete search history.

(56) References Cited

U.S. PATENT DOCUMENTS

| | | | |
|---|---|---|---|
| 4,217,580 | A | 8/1980 | Lowenschuss |
| 4,713,662 | A | 12/1987 | Wiegand |
| 4,740,909 | A | 4/1988 | Conklin et al. |
| 4,743,905 | A | 5/1988 | Wiegand |
| 5,467,397 | A | 11/1995 | West et al. |
| 5,553,126 | A | 9/1996 | Tang |
| 6,044,071 | A | 3/2000 | Spilker, Jr. |
| 6,104,914 | A | 8/2000 | Wright et al. |
| 6,108,523 | A | 8/2000 | Wright et al. |
| 6,392,585 | B2 | 5/2002 | Huff et al. |
| 6,522,867 | B1 | 2/2003 | Wright et al. |
| 6,697,633 | B1 | 2/2004 | Dogan et al. |
| 6,882,689 | B2 | 4/2005 | Maggio et al. |

(Continued)

FOREIGN PATENT DOCUMENTS

| | | |
|---|---|---|
| FR | 2823922 | 10/2002 |
| JP | 60-076841 | 1/1985 |
| WO | WO99/33212 | 7/1999 |
| WO | WO2008029384 | 3/2008 |

OTHER PUBLICATIONS

Pettersson, "An Illustrated Overview of ESM and ECM Systems", Naval Postgraduate School Monterey, California, Sep. 1994.

(Continued)

*Primary Examiner* — Kenneth Lam

(74) *Attorney, Agent, or Firm* — Norton Rose Fulbright Canada LLP

(57) ABSTRACT

There is described the use of Digital Radio Frequency Memory (DRFM) modules to jam certain communication signals while allowing others to be received on a given frequency band. The DRFM modules exploit the multi-path phenomenon by using transmitted signals to cause full band destructive echoes and/or distortions. A set of receivers used in conjunction with the DRFM modules are aware of the exact multi-path induced by the DRFM modules and are therefore able to mitigate or even benefit from the effects of the destructive multi-path and maintain or improve communications.

29 Claims, 5 Drawing Sheets

(56) References Cited

U.S. PATENT DOCUMENTS

| | | | | |
|---|---|---|---|---|
| 7,142,617 | B2 | 11/2006 | Mohan | |
| 7,154,431 | B2 * | 12/2006 | Pace et al. | 342/15 |
| 7,376,394 | B2 | 5/2008 | Liu | |
| 7,719,457 | B1 * | 5/2010 | Tindall | 342/14 |
| 7,835,463 | B2 * | 11/2010 | Durtschi | 375/316 |
| 2004/0177310 | A1 | 9/2004 | Mohan et al. | |
| 2004/0192234 | A1 | 9/2004 | Glenn, Sr. et al. | |
| 2004/0208239 | A1 | 10/2004 | Karlsson | |
| 2004/0213327 | A1 | 10/2004 | Mills et al. | |
| 2004/0214520 | A1 | 10/2004 | Jung | |
| 2005/0078739 | A1 | 4/2005 | Korpet et al. | |
| 2005/0249266 | A1 | 11/2005 | Brown et al. | |
| 2006/0140251 | A1 | 6/2006 | Brown et al. | |
| 2006/0153280 | A1 | 7/2006 | Karlsson | |
| 2006/0153281 | A1 | 7/2006 | Karlsson | |
| 2006/0164283 | A1 | 7/2006 | Karlsson | |
| 2006/0227035 | A1 | 10/2006 | Gounalis | |
| 2007/0004330 | A1 | 1/2007 | Twitchell, Jr. et al. | |
| 2007/0080847 | A1 | 4/2007 | Gounalis | |
| 2007/0116093 | A1 | 5/2007 | Karlsson | |
| 2007/0206177 | A1 | 9/2007 | Anschel et al. | |
| 2007/0268843 | A1 | 11/2007 | Pontano et al. | |
| 2007/0297489 | A1 | 12/2007 | Karlsson | |
| 2008/0015776 | A1 | 1/2008 | Norman et al. | |
| 2008/0026689 | A1 | 1/2008 | Johnson et al. | |
| 2008/0056340 | A1 | 3/2008 | Foegelle | |
| 2008/0304666 | A1 | 12/2008 | Chester et al. | |
| 2009/0061759 | A1 | 3/2009 | Stoddard et al. | |
| 2009/0097531 | A1 * | 4/2009 | Franceschini et al. | 375/133 |
| 2009/0262006 | A1 | 10/2009 | McNeill et al. | |
| 2009/0310650 | A1 | 12/2009 | Chester et al. | |
| 2010/0226497 | A1 | 9/2010 | Michaels et al. | |

OTHER PUBLICATIONS

Schuerger et al., "Multifrequency OFDM SAR in Presence of Deception Jamming", Eurasip Journal on Advances in Signal Processing, Vol. 2010, Art. ID 451851, 13 pages, 2010.

Erdogmus et al., "Nonlinear Channel Equalization Using Multilayer Perceptrons with Information—Theoretic Criterion", Elect. & Comp. Eng. Dept., University of Florida, Gainesville, FL 32611, 9 pages, IEEE, 2001.

El Assad et al., "Digital Chaotic Codec for DS-CDMA Communication Systems", Lebanese Science Journal, vol. 7, No. 2, 17 pages, 2006.

Dmitriev et al., "Amplitude Modulation and Demodulation of Chaotic Signals", Institute of Radio-Engineering and Electronics, Russian Academy of Sciences, 2010.

Vishnukanth et al., "SLM based PAPR reduction of an OFDM signal using new phase sequence", 2 pages, IEEE, Nov. 2009.

Abstract of Tian et al., "Performance Analysis of Quadrature Chaos Amplitude Modulation under Fading Channels", (China Airborne Missile Academy, Luoyang 471009, China; College of Information and Communication Engineering, Harbin Engineering University, Harbin 150001, China); [J];Journal of System Simulation, 2008-09; [http://en.cnki.com.cn/Article_en/CJFDTOALl-XTFZ200713059.htm].

Abstract of Tian et al., "Design of Quadrature Amplitude Modulation Based on Chaos Carrier", (School of Information and Communication Engineering, Harbin Engineering University, Harbin 150001, China); [J];Journal of System Simulation; 2007-13, [http://en.cnki.com.cn/Article_en/CJFDTOTAL-XTFZ200809035.htm].

Burghelea et al., "Coherent Synchronization of a Chaotic Communication System Based on a QAM-4 Transmitter", ICISP 2008, LNCS 5099, pp. 552-561, 2008.

Ding et al., "A Multiple Carrier Scheme for Chaos-Based Digital Communication Systems", Wireless Communications, Networking and Mobile Computing, 2009, WiCom'09, IEEE 2009.

Kaddoum et al., "Theoretical performance for asynchronous multiuser chaos-based communication systems on fading channels", Signal Processing 90 (2923-2933), Elsevier B.V. Nov. 2010.

* cited by examiner

SIMULTANEOUS COMMUNICATIONS JAMMING AND ENABLING ON A SAME FREQUENCY BAND

CROSS-REFERENCE TO RELATED APPLICATIONS

This application claims priority under 35 U.S.C. §119(e) from U.S. Provisional Patent Application No. 61/350,122, filed on Jun. 1, 2010, the contents of which are hereby incorporated by reference.

TECHNICAL FIELD

The present invention relates to the field of jamming systems targeting hostile communication signals while still allowing friendly communication signals to be received.

BACKGROUND OF THE ART

Radio signals, whether they come from a standard one-way radio or a two-way radio (such as a cellular phone) can be disrupted or jammed using a jamming device. A jamming device transmits on the same frequency as the radio in order to prevent a receiver from successfully recovering a radio signal. Disrupting communication between a radio and a receiver may be done using various techniques. For example, the jamming device may overpower the radio by transmitting a signal on the same frequency at a high enough power and for a long enough time that the noise or interference created by this jamming device will prevent the victim receiver from successfully recovering its intended signal.

Some jammers are tuned to block only one frequency, others block a group of frequencies or a sub-band, and yet others can block several types of networks at once or all frequencies in a frequency band. Selecting only some frequencies to jam in the hope of generating high enough noise levels at the victim receivers or in order to not disrupt friendly communication channels leaves an area vulnerable to hostile signals using other frequencies or traveling on other frequencies to escape jamming. However, effectively blocking all frequencies of a given band will not allow friendly signals to be received, essentially cutting off all friendly communications for that area.

Therefore, there is a need for a system that can block hostile signals from all frequencies across a given frequency band, while still allowing friendly signals to be received on these same frequencies.

SUMMARY

There is described herein the use of Digital Radio Frequency Memory (DRFM) modules to jam certain communication signals while allowing others to be received on a given frequency band. The DRFM modules exploit the multi-path phenomenon by artificially creating multi-path that causes destructive echoes over an entire band or over a significant portion of a band. A set of receivers used in conjunction with the DRFM modules are aware of the exact multi-path induced by the DRFM modules and are therefore able to mitigate or even benefit from the effects of the destructive multi-path and maintain or improve communications.

A single DRFM module can similarly and simultaneously treat a large number of independent signals and therefore induce the above described effects over an entire frequency band or over a significant part of a frequency band. More than one such DRFM module can be deployed over a given area to improve DRFM coverage and effectiveness.

In accordance with a first broad aspect, there is provided a method for enabling friendly communication signals to be received while jamming hostile communication signals, the method comprising: receiving a communication signal having a known component and an unknown component at a Digital Radio Frequency Memory (DRFM) module and storing a coherent copy in digital memory; altering the communication signal in a predetermined manner; retransmitting an altered communication signal; receiving the communication signal and the altered communication signal at a friendly receiver; searching for the known component in the communication signal and in the altered communication signal, the friendly receiver having knowledge of the predetermined manner in which the communication signal is altered; and isolating a non-artificial multi-path channel for the communication signal and receiving the unknown component at the receiver.

In accordance with a second broad aspect, there is provided a system for enabling friendly communication signals to be received while jamming hostile communication signals, the system comprising: at least one Digital Radio Frequency Memory (DRFM) module adapted to receiving a communication signal having a known component and an unknown component, store a coherent copy in digital memory, alter the communication signal in a predetermined manner, and retransmit the altered communication signal; and at least one friendly receiver having knowledge of the predetermined manner in which the communication signal is altered and adapted to receive the communication signal and the altered communication signal, search for the known component in the communication signal and in the altered communication signal, isolate a non-artificial multi-path channel for the communication signal, and receive the unknown component at the receiver.

In accordance with a third broad aspect, there is provided a Digital Radio Frequency Memory (DRFM) module for enabling friendly communication signals to be received at friendly receivers while jamming hostile communication signals at hostile receivers, the DRFM module adapted to receive a communication signal having a known component and an unknown component, store a coherent copy in digital memory, alter the communication signal in a predetermined manner known to the friendly receivers, and retransmit the altered communication signal.

In this specification, the term “unnatural” is used when referring to a manner in which a communication signal may be modified, and is intended to mean that the signal is modified such that a processing tool, such as an equalizer, typically used to recover a signal transmitted through an intersymbol interference (ISI) channel (due to multi-path propagation), or a space-time decoder that typically uses the knowledge it has received of indirect channel impairments to exploit such channels to enhance signal diversity and communication reliability, is unable to adapt to the changes made to the communication signal due to the unpredictable and/or unmanageable nature of the change. This may be done by having the signal vary in a manner that is faster than what the receiver can process, or by modifying the signal in another unnatural way, such as by providing a frequency-domain inversion or other drastic changes in the echo characteristic. Other “unnatural” modifications will be readily understood by those skilled in the art.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
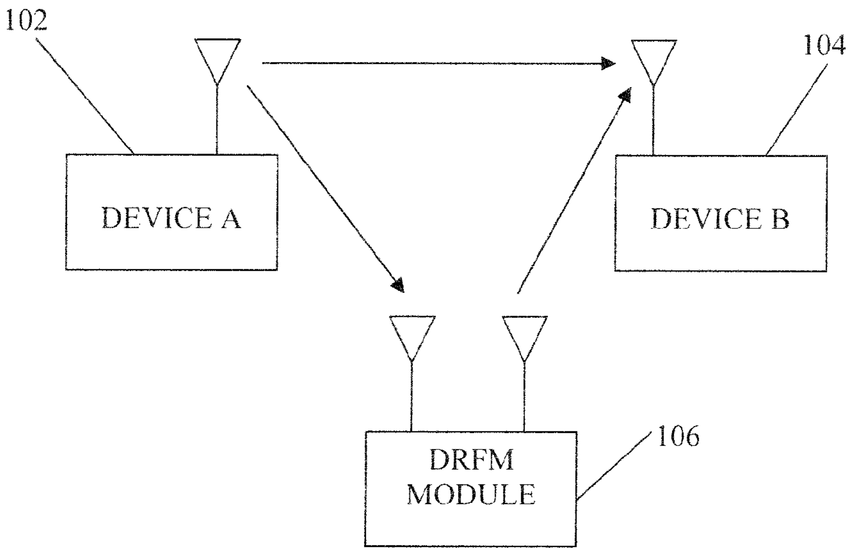
FIG. 1A illustrates an exemplary system for enabling friendly communication signals to be received while jamming hostile communication signals across a given frequency band using a single DRFM module.
Figure 1B:
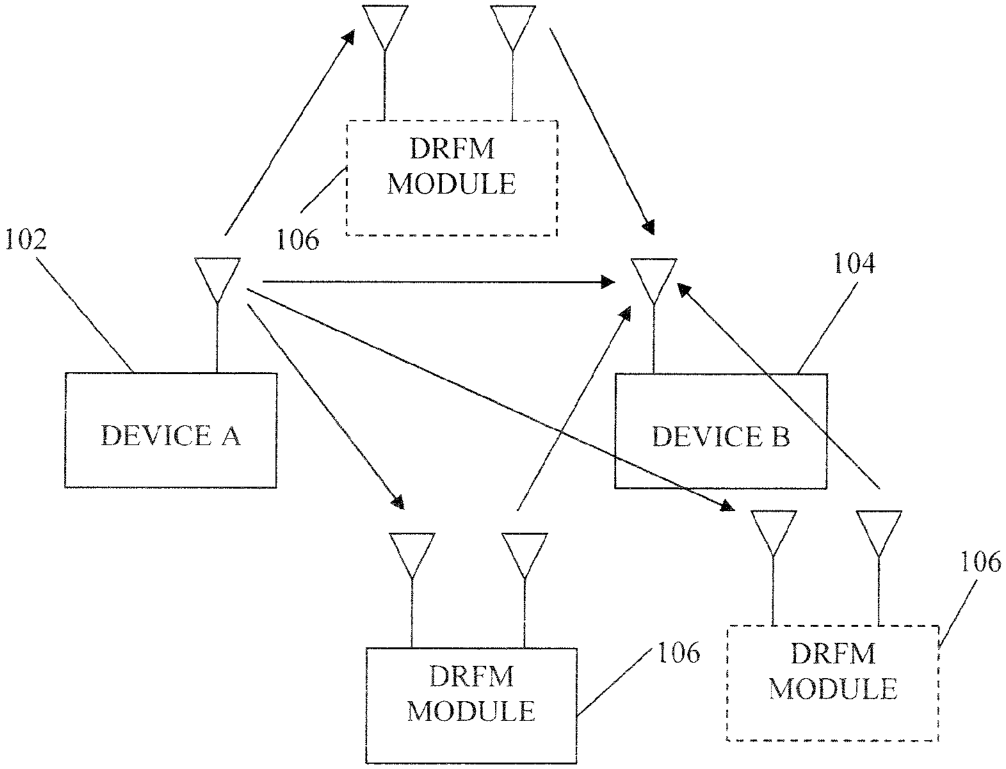
FIG. 1B illustrates another exemplary system as per FIG. 1, with multiple DRFM modules present.

FIG. 1A illustrates a system for enabling friendly communication signals to be received while jamming hostile communication signals. In any given zone, there may be pairs of devices 102, 104 attempting to communicate with each other. A Digital Radio Frequency Memory (DRFM) module 106 is present to act as a jamming device for the communication signals if these pairs of transmitters/receivers are hostile and the intent is to prevent hostile communications from being received. In FIG. 1A, devices A (102) and B (104) may be hostile or friendly. In one embodiment, the DRFM module 106 will act in a same manner in both cases, but the effect on the hostile receiver will be to prevent the successful reception of the signal coming from an hostile transmitter while the reception by the friendly receiver of the signal coming from a friendly device will be received without disruption and, in one embodiment, will even be enhanced.

The DRFM module 106 is designed to digitize an incoming RF input signal at a frequency and bandwidth necessary to adequately represent the signal, and then re-transmit that RF signal. Since it is generated from a digital duplicate of the original transmit signal, the altered RF signal is coherent with the source of the received signal. The DRFM module 106 modifies the signal prior to retransmitting it. Examples of modifications or alterations to the received signal are adding a delay, drastically and/or very rapidly changing the delay, changing the phase, and changing the smoothness of the signal. The signal may also be amplified before being retransmitted so as to arrive at a high enough level at the intended receiver or receivers.

In one embodiment, the received signal is modified using known techniques, such as delays, phase changes, etc. This will create a destructive multipath signal that is sufficient to significantly degrade communications between a standard transmitter and receiver so as to essentially deny any effective communications between the transmitter and the receiver.

In another embodiment, the hostile receiver may be equipped with a processing tool, such as an equalizer, typically used to recover a signal transmitted through an intersymbol interference (ISI) channel (due to multipath propagation). In this case, the DRFM module 106 may be adapted to modify the received signal in an unnatural way in order to prevent the equalizer from correcting for the changes made to the signal.

In yet another embodiment, the hostile receiver may be equipped with more sophisticated processing tools, such as space time codes, multiple-input and multiple-output (MIMO), Orthogonal frequency-division multiplexing (OFDM) and/or Orthogonal Frequency Division Multiple Access (OFDMA) modulation, where the problems created by multi-path channel are handled efficiently. In this case, the DRFM module 106 may be adapted to repeatedly or continuously transmit a modified signal with changes that vary at a sufficiently high speed and/or frequency to prevent the hostile receiver from adapting to the changes or from ever acquiring the representative indirect channel impairment knowledge it needs to recover the signal at the receiver.

Figure 2:
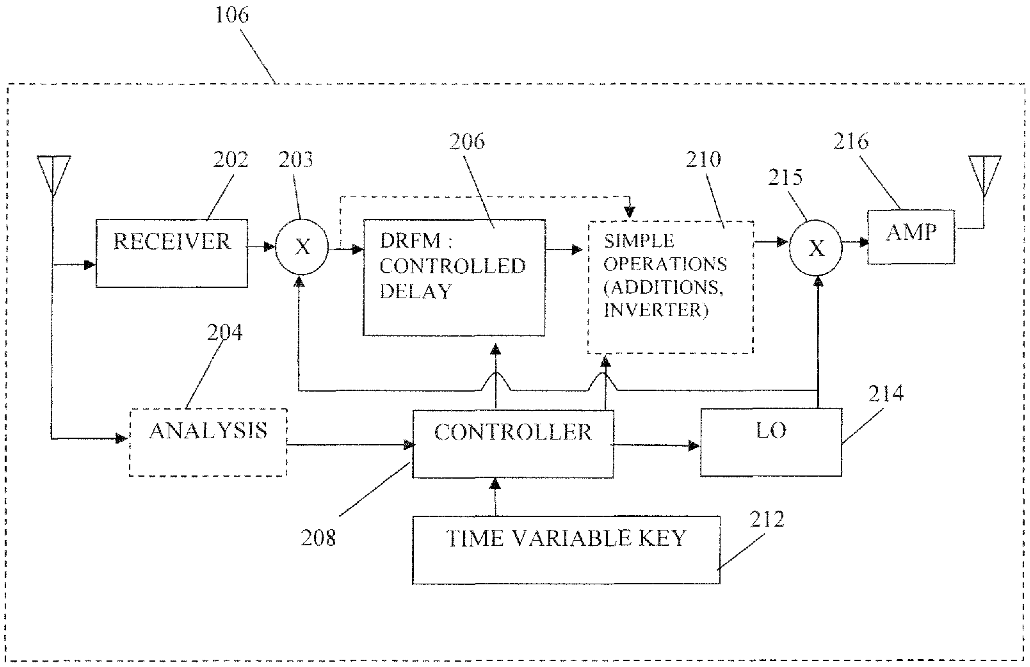
FIG. 2 is an exemplary embodiment of a DRFM module.

FIG. 2 illustrates an exemplary DRFM module 106. It is comprised of a receiving front-end (receiver 202) for filtering and amplifying a band of the spectrum. The received signal is down-converted 203 at an intermediate frequency determined by the Local Oscillator (LO) 214 setting. It is then stored in the DRFM 206, which essentially induces a controlled and variable delay selected by the controller 208. The controller 208 uses a secret time variable key 212 which is known by the friendly receivers. A received signal analysis may also be performed by an analysis module 204 to be used by the controller 208. This may be useful, for example, to render the jammer either more selective to friendly signals (to increase the relaying efficiency) or more selective to hostile signals (to increase jamming efficiency). The DRFM variable delay output can then be linearly combined to the original signal with variable gains (including possible inversion) on each path 210. Either the delayed signal or the combined signal is then up-converted to the original frequency 215 and it is amplified via an amplifier 216 to be transmitted through the antenna. The re-transmitted signal can cover an entire frequency band, selected parts of a frequency band, or more than one frequency band. Agile filters at the DRFM module output or other mechanisms known to those skilled in the art can be used to provide such frequency selectivity as required by the specific application.

Some examples of transformations to be applied to the communication signal are, in their simplest form, a variable delay or a variable sign inversion. Other alterations comprise the addition of the delayed signal to the original signal. A variable gain on each path can further be used to generate any two-path channel and multiple parallel delay elements can be used to generate more complex multi-path channels.

When jamming a communication signal coming from a hostile transmitter, the modified and retransmitted communication signal will cause distortion at the hostile receiver by preventing the hostile receiver from successfully detecting or recovering the communication signal.

In some embodiments, there are also friendly pairs of transmitters/receivers, i.e. pairs of devices for which communication should not be jammed. In order to allow communications from a friendly transmitter to be received, the DRFM module 106 is used in conjunction with a friendly receiver. The friendly receiver is equipped with knowledge of how the communication signal is modified by the DRFM module 106 in order to be able to adapt its processing of incoming signals accordingly.

When emitted from a friendly transmitter, the signal will contain a known component and an unknown component. The known component is present to allow the intended receiver to recognize the incoming signal as originating from a friendly transmitter. The communication signal emitted from the friendly transmitter may take the form of $S_f(x)$=data+$C_k$, where $C_k$ is the known component (such as a header in a data packet or a sync word), and the data is the unknown component. Similarly, a communication signal emitted from a hostile transmitter may take the form of $S_h(x)$ =data. None of the components emitted from the hostile transmitter are known, either to the DRFM module or to a friendly receiver.

When modifying the received signal, the DRFM module creates a signal of the form ($S_f(x)$=data+$C_k$)'. The friendly transmitter then receives $S_f(x)$ and $S_f(x)'$, the modified signal. Knowing the transformation that created $S_f(x)'$, the friendly receiver is capable of time-locating $C_k'$ from $S_f(x)'$. This allows the friendly receiver to isolate a non-artificial multi-path channel with the friendly transmitter in order to receiver the data.

In one embodiment, the friendly receiver discards the modified communication signal once it has been detected and receives the original communication signal.

In another embodiment, the friendly receiver uses the modified communication signal to enhance communication between the friendly transmitter and the friendly receiver by effectively isolating an artificial multi-path communication channel. For example, by applying an inverse of the function applied by the DRFM module to the modified signal, the original signal may be retrieved from the modified signal and in some cases it may even be of better quality than the one received directly from the friendly transmitter. In another embodiment, the two signals may be combined together to create an enhanced version of the original signal. A number of combination methods for multi-path, multi-channel or diversity systems are known by those skilled in the art: equal gain combining, maximal radio combining, rake receivers, maximal likelihood detection, etc.

Figure 3:
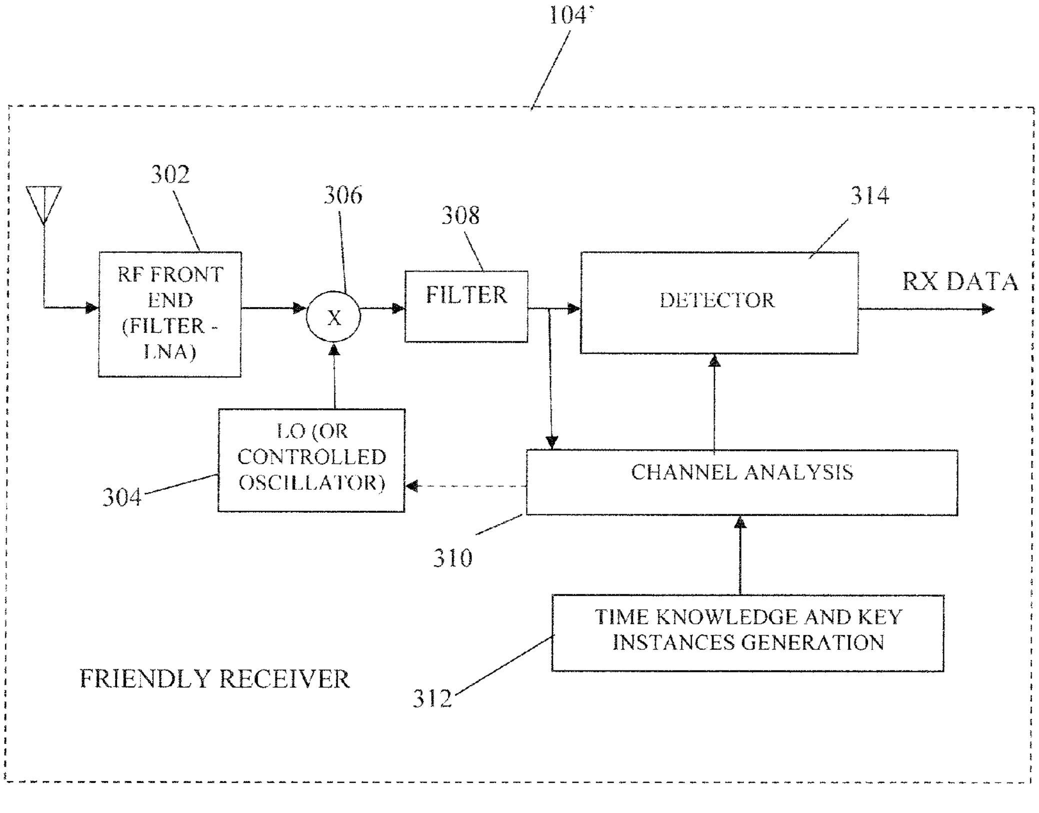
FIG. 3 is an exemplary embodiment of a friendly receiver.

FIG. 3 is an exemplary embodiment of a friendly receiver 104'. It is comprised of a receiving front-end 302 to select a frequency band and/or sub-band with a low noise amplifier. The signal is then down-converted to an intermediate frequency through a Local Oscillator 304 fed demodulator 306 followed by a filter 308. The resulting signal is analyzed to identify both the "naturally occurring" multi-path channel and the DRFM jammer induced channel. A maximum likelihood analysis is adapted to the natural multi-path and to the known DRFM-induced "unnatural" multi-path. A channel analysis 310 is done to perform a correlation or other statistical measure to identify both channel characteristics, and also to determine the synchronization of the key. Some time uncertainty knowledge 312 is used to generate a set of keys defining the search space for the statistical analysis of the received signal characteristics. This analysis, in its simplest form, may be a correlation of the received signal with all possible delayed versions of the transmitted and transformed signal. The necessary features are then used by a detector 314 which will equalize, combine or use maximum likelihood on the two channels to provide a good decision on the original data used for signal transmission.

In some embodiments, the DRFM module is further adapted to determine if the incoming or received signal is from a hostile transmitter or a friendly transmitter. The signal may be identified using the known component, or another form of identification such as a watermark. If the received signal is identified and found to be weak, i.e. below a given intensity threshold, the DRFM module may choose to omit sending the signal in order to avoid retransmitting and amplifying a signal that would be treated as noise by the friendly receiver.

Figure 4:
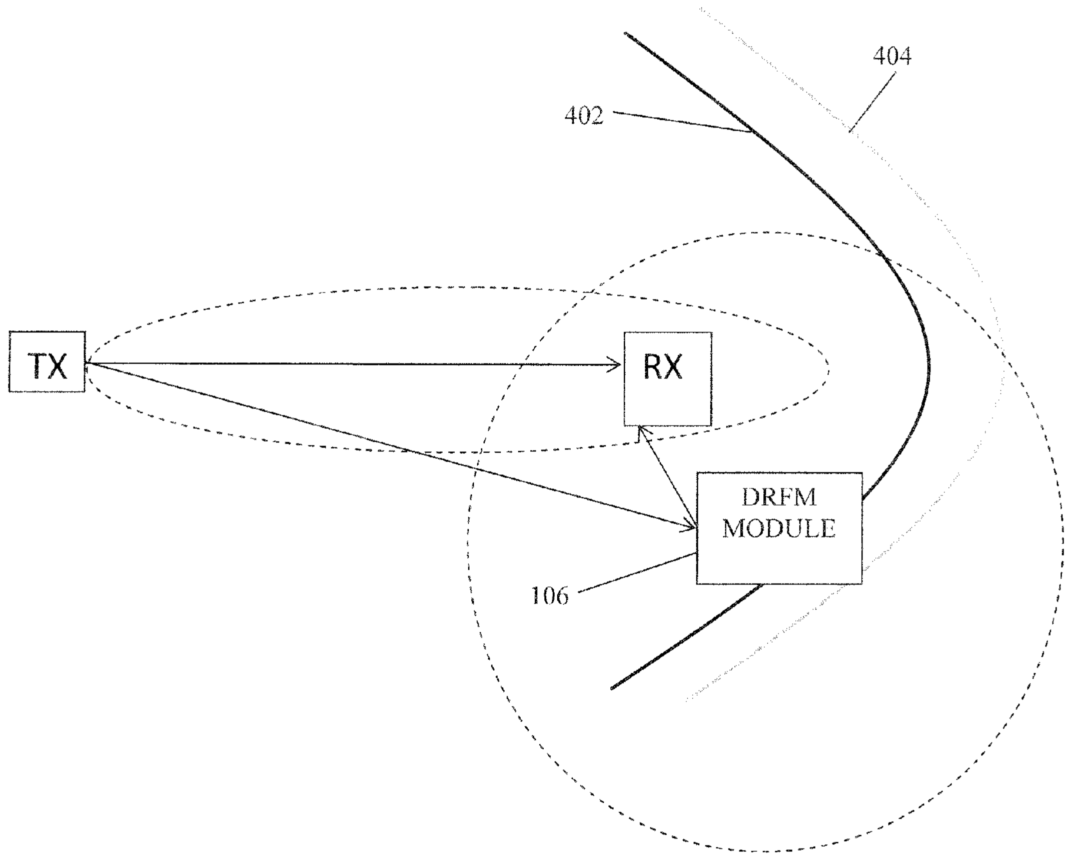
FIG. 4 is a schematic illustrating a useful range for using the DRFM modules, in accordance with one embodiment.

FIG. 4 illustrates the utility of the DRFM module 106 when acting as a relay (and not as a jammer), as a function of its proximity to the friendly transmitter and/or the friendly receiver. Given the lack of utility in amplifying and relaying noise, the range of constructive effect on friendly communication signals is illustrated by line 402. The range of destructive effect on friendly communication signals caused by having repeated noticeable noise levels is illustrated by the space between line 402 and line 404. When positioned beyond line 404, the DRFM module 106 has little to no effect on the communication signal sent by the transmitter and received by the receiver.

In some embodiments, the receiver 104' is unaware of the exact location of the fixed or mobile DRFM module 106, or it is mobile itself and therefore, its distance with respect to the DRFM module 106 is unknown and/or changing. In these cases, there may be some uncertainty at the friendly receiver 104' as to the exact transformation applied to the communication signal in order to modify it, especially if the transformation involves a delay. Therefore, a time analysis may be provided inside the receiver to minimize the uncertainty.

The DRFM module 106 is capable of jamming a large band of frequencies while enabling communications between friendly transmitter/receiver pairs. There is no need to exclude any portion of the band from the effects of jamming to maintain friendly communication. In addition, the coherent nature of the DRFM module 106 allows it to remain covert with respect to hostile transmitters, as compared to noise or continuous wave (CW) jamming waveforms. Because DRFM jamming waveforms are fully coherent and matched against victim radios, lower jammer transmitter power can be used than with more traditional non-coherent noise or CW jammers. As long as the DRFM band of activity is as wide as the hostile radio frequency agility range, known ECCM (Electro-Counter-Counter-Measure) techniques such as frequency hopping, direct sequence spread spectrum and other signal spreading methods used to increase a receiver processing gain remain ineffective against the action of the jammer.

In one embodiment, a plurality of DRFM modules are provided in an area of interest in order to provide comprehensive coverage of the area. This would increase the difficulty for hostile transmitter/receiver pairs to communicate, without affecting communication between friendly transmitter/receiver pairs. In addition, the DRFM modules may be used as relays for the friendly transmitter/receiver pairs in order to increase communication range and reliability, in a scheme similar to space-time coding (STC) techniques, by transmitting multiple, redundant copies of a data stream to the receiver in the hope that at least some of them may survive the physical path between transmission and reception in a good enough state to allow reliable decoding.

FIG. 18 illustrates an example with multiple DRFM modules 106 present in proximity to a transmitter/receiver pair. In one embodiment, the receiver 104 is a friendly receiver and is capable of isolating more than one artificial multi-path channel in order to enhance the communication signal. In one embodiment, the DRFM modules 106 are each configured to operate in a same way, i.e. use a same key to alter a communication signal. In an alternative embodiment, the DRFM modules 106 may use different keys, and the friendly receiver is configured to also use the different keys to isolate the different artificial multi-path channels.

In some embodiments, the DRFM modules may be configured to selectively operate in the signal bandwidths of friendly receivers when jamming is not required. When spectrum dominance and denial is required, the DRFM modules are configured to operate over the entire band or targeted subsets thereof.

Figure 5:
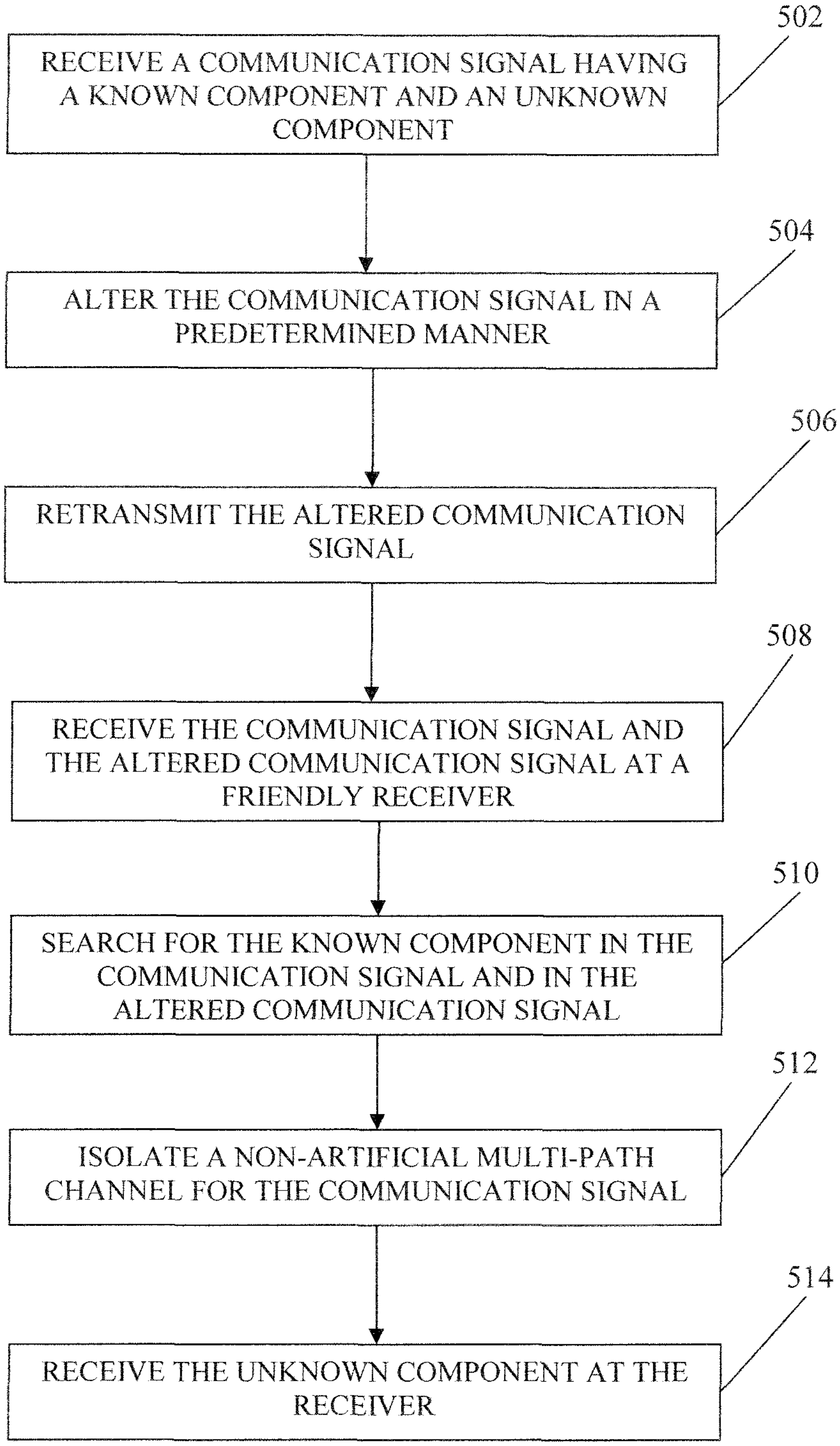
FIG. 5 is a flowchart illustrating a method for enabling friendly communication signals to be received while jamming hostile communication signals across a given frequency band, in accordance with one embodiment.

In accordance with the system presented above, the method illustrated in the flowchart of FIG. 5 may be performed as follows. In a first step, a communication signal is received 502. This signal, when coming from a friendly transmitter, will have a known component and an unknown component. It is received at a DRFM module for altering in a predetermined manner 504 by applying any one of a plurality of unnatural changes thereto. The altered signal is retransmitted 506 and received at a friendly receiver, along with the original communication signal 508.

In the friendly transmitter, the known component is searched for in the original communication signal and in the altered communication signal 510. This is possible because the friendly receiver is aware of the alterations or modifications made to the signal by the DRFM module, and it allows the friendly receiver to isolate a non-artificial multi-path channel for the communication signal 512, in order to receive the unknown component from the friendly transmitter 514.

In one embodiment, the receiver will also isolate an artificial multi-path channel and receive the unknown component from the DRFM module, in an altered state. The altered communication signal may then be used to enhance and in some cases replace the original communication signal.

In another embodiment, a plurality of DRFM modules are present and identified by the friendly receiver. The receiver may then isolate more than one artificial multi-path channel and use those that may enhance the signal while discarding those that are not needed. For example, if three altered signals are received via artificial multi-path channels, two of them being of good quality and one being of lower quality, the lower quality one may be discarded and the other two higher quality ones may be combined with the original communication channel. Alternatively, a single one of a plurality of altered signals received on artificial multi-path channels may be selected, on the basis of a quality comparison amongst the received signals.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present invention can be carried out as a method, can be embodied in a system, a computer readable medium or an electrical or electro-magnetic signal. The embodiments of the invention described above are intended to be exemplary only. The scope of the invention is therefore intended to be limited solely by the scope of the appended claims.

We claim:

1. A method for enabling friendly communication signals to be received while jamming hostile communication signals, the method comprising:

receiving a communication signal having a known component and an unknown component at a Digital Radio Frequency Memory (DRFM) module and storing a coherent copy in digital memory;

altering the communication signal in a predetermined manner;

retransmitting an altered communication signal;

receiving the communication signal and the altered communication signal at a friendly receiver;

searching for the known component in the communication signal and in the altered communication signal, the friendly receiver having knowledge of the predetermined manner in which the communication signal is altered; and isolating a non-artificial multi-path channel for the communication signal and receiving the unknown component at the receiver.

2. The method of claim 1, further comprising identifying and using at least one artificial multi-path channel to receive and use the altered communication signal.

3. The method of claim 2, wherein using the altered communication signal comprises discarding the communication signal and replacing it with the altered communication signal.

4. The method of claim 2, wherein using the altered communication signal comprises combining the communication signal with the altered communication signal in order to enhance the communication signal.

5. The method of claim 1, wherein altering the communication signal comprises adding an unnatural delay or phase change thereto.

6. The method of claim 1, wherein altering the communication signal comprises applying a time variable key known to the friendly receiver.

7. The method of claim 1, wherein retransmitting the altered communication signal comprises repeatedly or continuously transmitting the altered communication signal with changes that vary at a high speed and/or frequency to prevent a hostile receiver from acquiring representative indirect channel impairment knowledge it needs to recover the signal.

8. The method of claim 1, further comprising, at the DRFM module, determining whether the transmitter of the communication signal is hostile or friendly, and abstaining from retransmitting the altered communication signal if the intensity of the communication signal is below a given threshold.

9. The method of claim 1, further comprising, at the DRFM module, determining whether the transmitter of the communication signal is hostile or friendly, and wherein the DRFM module transmits multiple redundant copies of the communication signal for a friendly transmitter.

10. The method of claim 1, wherein the DRFM module is mobile.

11. The method of claim 10, wherein searching for the known component comprises performing a time analysis to minimize uncertainty with respect to a distance of the DRFM module.

12. The method of claim 1, wherein receiving a communication signal having a known component and an unknown component at a Digital Radio Frequency Memory (DRFM) module comprises receiving the communication signal at a plurality of DRFM modules in a given area, each DRFM module performing the steps of altering the communication signal and retransmitting the altered communication signal.

13. The method of claim 12, wherein the plurality of DRFM modules alter the communication signal in different ways.

14. The system of claim 1, wherein the at least one DRFM module is mobile.

15. The system of claim 14, wherein the friendly receiver is adapted to perform a time analysis when searching for the known component.

16. A system for enabling friendly communication signals to be received while jamming hostile communication signals, the system comprising:

at least one Digital Radio Frequency Memory (DRFM) module adapted to receiving a communication signal having a known component and an unknown component, store a coherent copy in digital memory, alter the communication signal in a predetermined manner, and retransmit the altered communication signal; and at least one friendly receiver having knowledge of the predetermined manner in which the communication signal is altered and adapted to receive the communication signal and the altered communication signal, search for the known component in the communication signal and in the altered communication signal, isolate a non-artificial multi-path channel for the communication signal, and receive the unknown component at the receiver.

17. The system of claim 16, wherein the friendly receiver is adapted to isolate at least one artificial multi-path channel to receive and use the altered communication signal.

18. The system of claim 17, wherein the friendly receiver uses the altered communication signal by discarding the communication signal and replacing it with the altered communication signal.

19. The system of claim 17, wherein the friendly receiver uses the altered communication signal by combining the communication signal with the altered communication signal in order to enhance the communication signal.

20. The system of claim 16, wherein the DRFM module is adapted to alter the communication signal by adding an unnatural delay or phase change thereto.

21. The system of claim 16, wherein the DRFM module is adapted to alter the communication signal by applying a time variable key known to the friendly receiver.

22. The system of claim 16, wherein the DRFM module is adapted to repeatedly transmit the altered communication signal with changes that vary at a high speed and/or frequency to prevent a hostile receiver from acquiring representative indirect channel impairment knowledge it needs to recover the signal.

23. The system of claim 16, wherein the DRFM module is adapted to determine whether the transmitter of the communication signal is hostile or friendly, and abstain from retransmitting the altered communication signal if the intensity of the communication signal is below a given threshold.

24. The system of claim 16, wherein the DRFM module is adapted to determine whether the transmitter of the communication signal is hostile or friendly, and transmit multiple redundant copies of the communication signal for a friendly transmitter.

25. The system of claim 16, wherein the at least one DRFM module comprises a plurality of DRFM modules that alter the communication signal in different ways.

26. The system of claim 16, wherein the DRFM module is adapted to receive and transmit communication signals across an entire frequency band.

27. A Digital Radio Frequency Memory (DRFM) module for enabling friendly communication signals to be received at friendly receivers while jamming hostile communication signals at hostile receivers, the DRFM module comprising a radio receiver adapted to receive a communication signal having a known component and an unknown component, a digital memory adapted to store a coherent copy, a controller adapted to cause an alteration of the communication signal in a predetermined manner known only to the friendly receivers, and a transmitter adapted to retransmit the altered communication signal.

28. The DRFM module of claim 27, wherein the predetermined manner is an unnatural change to the communication signal.

29. The DRFM module of claim 28, wherein reception and transmission of signals occurs over an entire frequency band.

* * * * *